US012274252B2

(12) United States Patent
Meyers

(10) Patent No.: US 12,274,252 B2
(45) Date of Patent: Apr. 15, 2025

(54) ICE FISHING REEL SUPPORT AND COVERING SYSTEM

(71) Applicant: Scott Patrick Meyers, Wanamingo, MN (US)

(72) Inventor: Scott Patrick Meyers, Wanamingo, MN (US)

(*) Notice: Subject to any disclaimer, the term of this patent is extended or adjusted under 35 U.S.C. 154(b) by 266 days.

(21) Appl. No.: 18/076,078

(22) Filed: Dec. 6, 2022

(65) Prior Publication Data
US 2024/0180134 A1 Jun. 6, 2024

(51) Int. Cl.
*A01K 97/01* (2006.01)
*A01K 89/08* (2006.01)

(52) U.S. Cl.
CPC ............ *A01K 97/01* (2013.01); *A01K 89/08* (2013.01)

(58) Field of Classification Search
CPC .................. A01K 89/08; A01K 97/01
See application file for complete search history.

(56) References Cited

U.S. PATENT DOCUMENTS

| 4,662,099 | A | * | 5/1987 | Stewart | A01K 97/01 43/17 |
|---|---|---|---|---|---|
| 4,685,240 | A | | 8/1987 | Fralick | |
| 4,747,226 | A | * | 5/1988 | Todd | A01K 97/01 43/4 |
| 5,044,108 | A | | 9/1991 | Rinehart | |
| 5,157,855 | A | | 10/1992 | Schmidt | |
| 5,235,773 | A | | 8/1993 | Rinehart | |
| 5,339,558 | A | | 8/1994 | Monsen | |
| 8,943,733 | B2 | | 2/2015 | Katz | |
| 10,631,530 | B1 | | 4/2020 | Peterman | |
| 11,064,687 | B2 | | 7/2021 | McCarter | |
| 2017/0265446 | A1 | * | 9/2017 | Dungan | A01K 99/00 |
| 2018/0206469 | A1 | * | 7/2018 | Dungan | A01K 97/01 |
| 2023/0070991 | A1 | * | 3/2023 | Makos | A01K 97/01 |

* cited by examiner

*Primary Examiner* — Richard G Davis

(57) ABSTRACT

An ice fishing reel support and covering system includes a sleeve having a perimeter wall including an upper edge and a lower edge. The sleeve is positionable in and forms a liner for the ice fishing hole. A reel mount is attached to and positioned in the sleeve. The reel mount is configured receives a fishing reel. The reel mount is adjustable to a first position wherein the reel mount and the fishing reel are each positioned below a plane of the upper edge and within an interior of the sleeve, or to a second position wherein the reel mount extends above the plane of the upper edge to position the fishing reel above the interior of the sleeve.

19 Claims, 14 Drawing Sheets

ICE FISHING REEL SUPPORT AND COVERING SYSTEM

(b) CROSS-REFERENCE TO RELATED APPLICATIONS

Not Applicable

(c) STATEMENT REGARDING FEDERALLY SPONSORED RESEARCH OR DEVELOPMENT

Not Applicable

(d) THE NAMES OF THE PARTIES TO A JOINT RESEARCH AGREEMENT

Not Applicable

(e) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(f) STATEMENT REGARDING PRIOR DISCLOSURES BY THE INVENTOR OR JOINT INVENTOR

Not Applicable

(g) BACKGROUND OF THE INVENTION

(1) Field of the Invention

The disclosure relates to ice fishing line spool holding device and more particularly pertains to a new ice fishing line spool holding device for allowing a fishing reel to be supported within an ice fishing hole and which allows for manipulation of the position of the fishing reel without removing the same from a mount. The fishing reel may thus be placed below an upper end of a fishing opening in an ice fishing house floor to prevent persons within the ice fishing house from accidentally tripping over the fishing reel. Additionally, the device may be part of a system which includes a cover that allows protects users from stepping into the ice fishing hole as well as prevents articles from falling into the water of an ice fishing hole.

(2) Description of Related Art Including Information Disclosed Under 37 CFR 1.97 and 1.98

The prior art relates to ice fishing line spool holding devices that are typically static and place the reel above the flooring of an ice fishing house. While such devices do function as needed, they also present a hazard to persons moving about the ice fishing house. Thus, tripping and fishing line entanglements are concerns, particularly when young children are in the ice fishing house.

(h) BRIEF SUMMARY OF THE INVENTION

An embodiment of the disclosure meets the needs presented above by generally comprising a sleeve that has a perimeter wall and includes an upper edge and a lower edge. The sleeve is positionable in and forms a liner for an ice fishing hole. A perimeter shoulder is co-extensively attached to and extends horizontally away from the upper edge. A reel mount is attached to and positioned in the sleeve. The reel mount is receives a fishing reel and is adjustable to a first position wherein the reel mount and the fishing reel are each positioned below a plane of the upper edge and within an interior of the sleeve, or to a second position wherein the reel mount extends above the plane of the upper edge to position the fishing reel above the interior of the sleeve. A cover is positionable on the sleeve to close an open upper end of the sleeve when the reel mount is in the first position such that the cover is positioned over the reel mount. The cover is removable to move the carriage to the second position.

Another embodiment of the disclosure includes a sleeve having a perimeter wall including an upper edge and a lower edge. The sleeve is positionable in and forms a liner for the ice fishing hole. A reel mount is attached to and positioned in the sleeve. The reel mount is configured receives a fishing reel. The reel mount is adjustable to a first position wherein the reel mount and the fishing reel are each positioned below a plane of the upper edge and within an interior of the sleeve, or to a second position wherein the reel mount extends above the plane of the upper edge to position the fishing reel above the interior of the sleeve.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(i) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(j) DETAILED DESCRIPTION OF THE INVENTION

Figure 1:
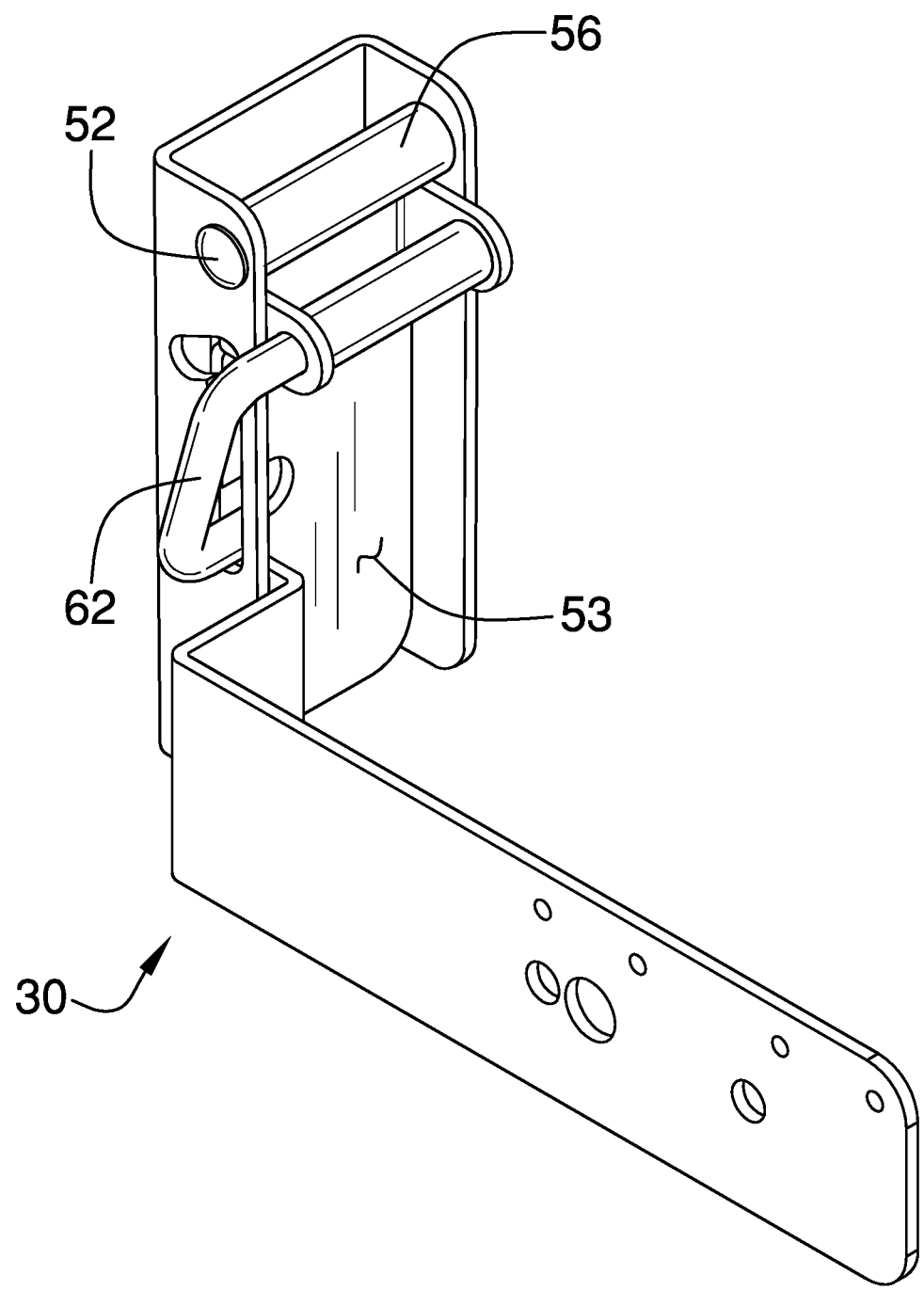
FIG. 1 is a front isometric view of a fishing reel mount of an ice fishing reel support and covering system according to an embodiment of the disclosure.

With reference now to the drawings, and in particular to FIGS. 1 through 14 thereof, a new ice fishing line spool holding device embodying the principles and concepts of an embodiment of the disclosure and generally designated by the reference numeral 10 will be described.

Figure 13:
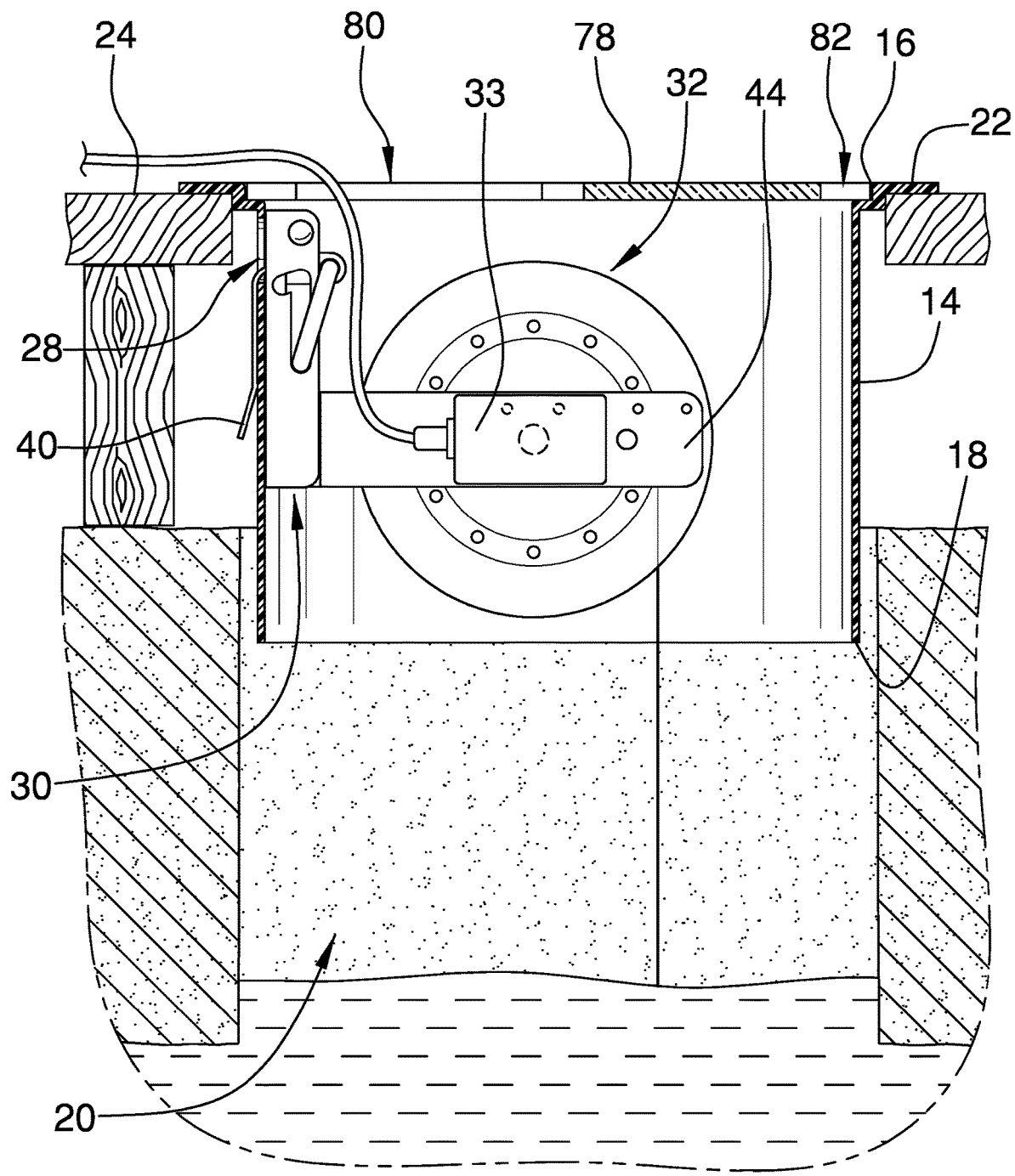
FIG. 13 is an in-use cross-sectional view of an embodiment of the disclosure.
Figure 14:
FIG. 14 is a top isometric in-use view of an embodiment of the disclosure.

As best illustrated in FIGS. 1 through 14, the ice fishing reel support and covering system 10 generally comprises a sleeve 12 having a perimeter wall 14 including an upper edge 16 and a lower edge 18. The sleeve 12 is positionable in and forms a liner for an ice fishing hole 20. A perimeter shoulder 22 is co-extensively attached to and extends horizontally away from the upper edge 16. The perimeter shoulder 22 may be abutted on the floor 24 of an ice fishing house 26 to retain the sleeve 12 in a static position relative to the ice fishing house 26. As can be seen in FIG. 13, the sleeve will most often at least extends from the floor 24 and into the ice fishing hole 20. The perimeter wall 14 has an aperture 28 extending therethrough that is positioned nearer the upper edge 16 than the lower edge 18.

A reel mount 30, shown in FIG. 1, is attached to the sleeve 12 and is configured to receive a fishing reel 32. In most embodiments, the fishing reel 32 may comprise a what is conventionally known as a "rattle reels" that include a mechanism for creating sounds when a spool holding fishing line is rotated; that is when the fishing reel 32 lets out fishing line. These may include clicking or bells sounds when a striking implement and a striking receiver engage each other when as a fish draws out fishing line. These types of fishing reels alert the person fishing that a fish is on the fishing line. Alternatively, electronic sensors 33 are mechanically coupled to the fishing reel 32 and can emit sounds and/or illuminate lights when the spool of a fishing reel is being rotated. The reel mount 30 of the current system 10 is adjustable to a first position wherein the reel mount 30 and the fishing reel 32 are each positioned below a plane of the upper edge 16 and within an interior of the sleeve 12. The reel mount 30 is also adjustable to a second position wherein the reel mount 30 extends above the plane of the upper edge 16 to position the fishing reel 32 above the interior of the sleeve 12.

The reel mount 30 includes a mounting plate 34 that is mountable on the sleeve 12. The mounting plate 34 has a back side 36 and a front side 38. The mounting plate 34 includes a catch 40 that is extended rearwardly from the back side 36. The catch 40 is positionable in the aperture 28 to releasably engage the perimeter wall 14. As can be seen in the figures, this allows for quick release of the reel mount 30 from the sleeve 12. However, alternate coupling assemblies may be utilized and the attachment between the reel mount 30 and the sleeve 14 may be more secure such as by extending fasteners through the sleeve 14 and the mounting plate 34. Alternatively, the sleeve 12 may include a first mating member and the reel mount 30 a second mating member that are detachably coupled to each other.

Figure 4:
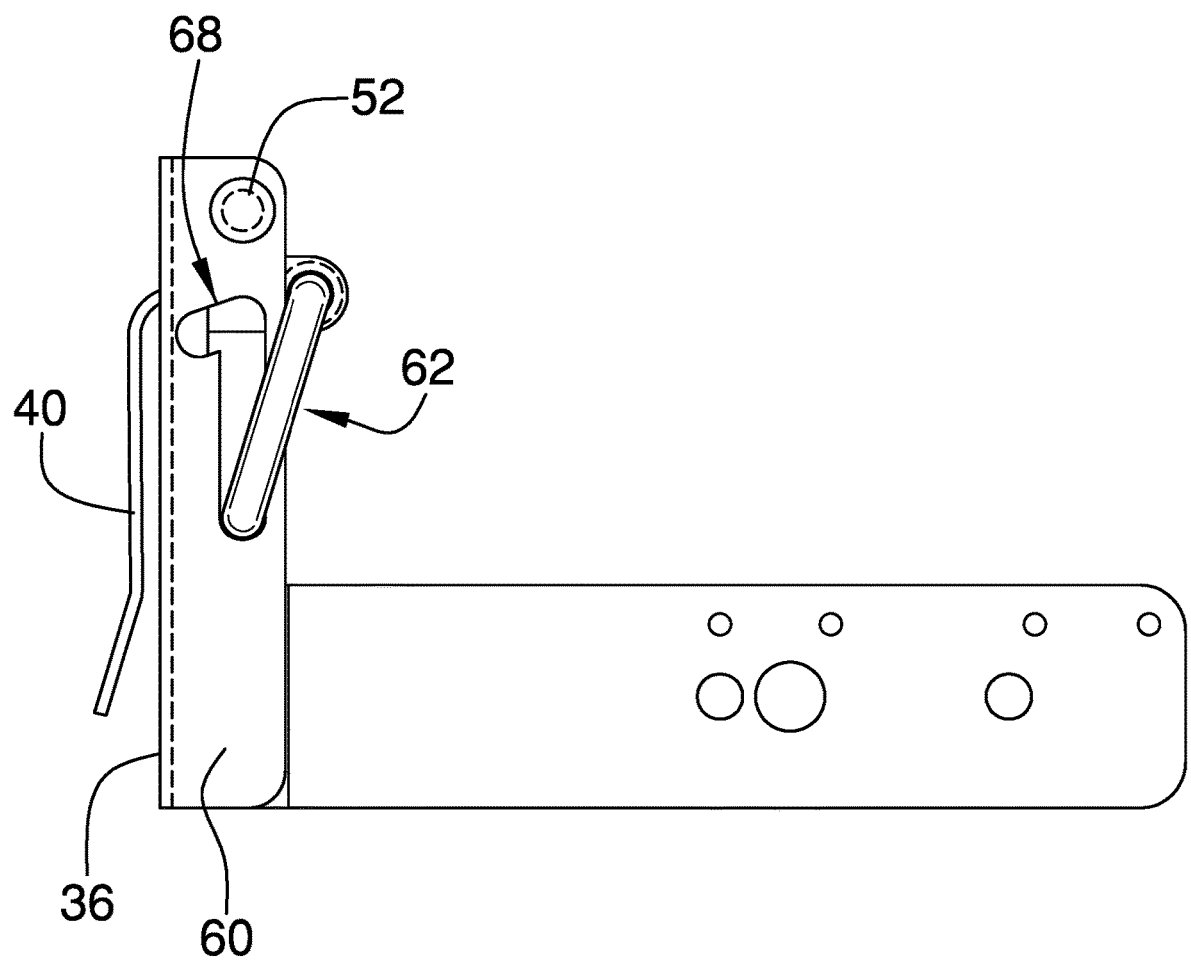
FIG. 4 is a left side view of an embodiment of the disclosure.
Figure 5:
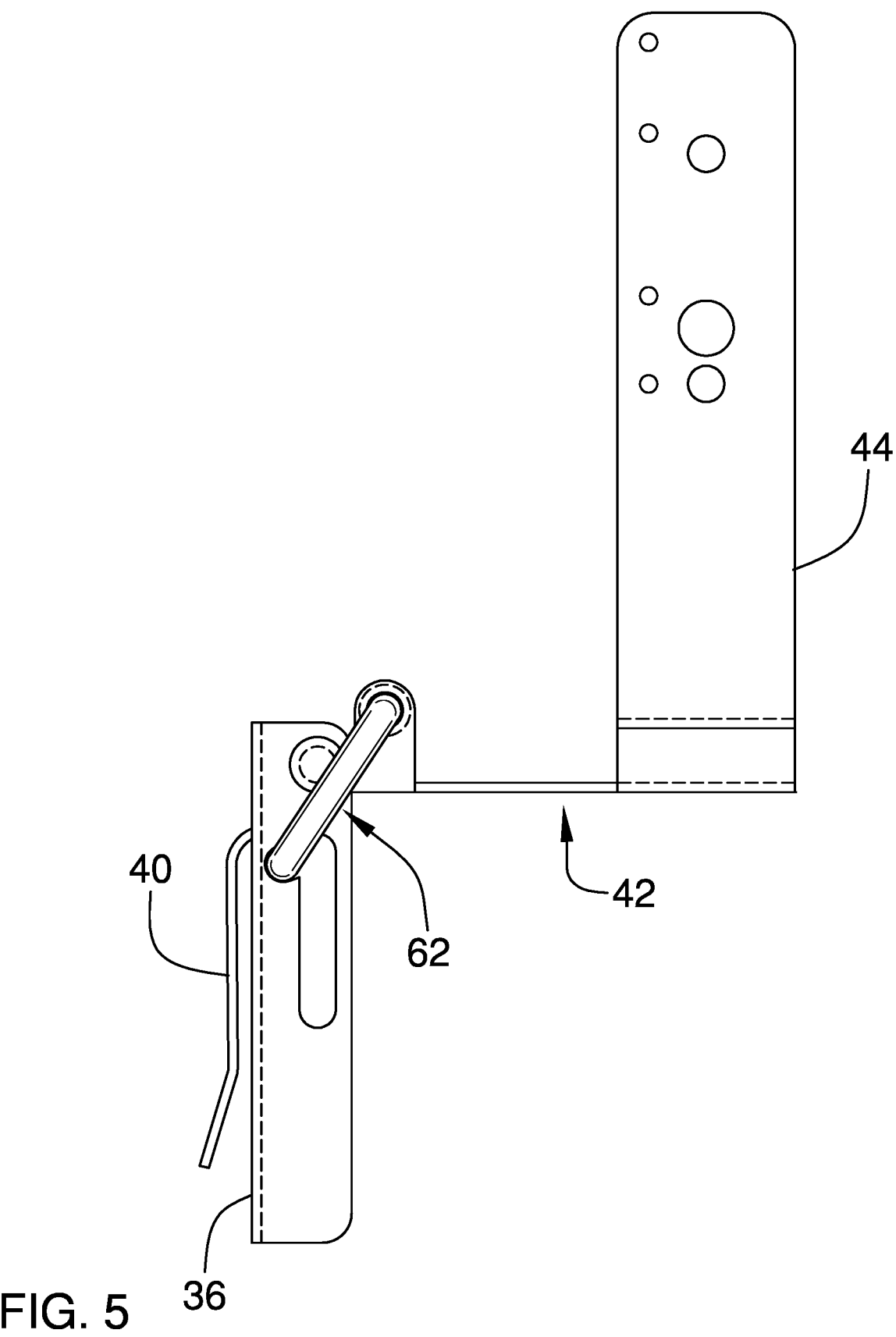
FIG. 5 is a left view of an embodiment of the disclosure.
Figure 6:
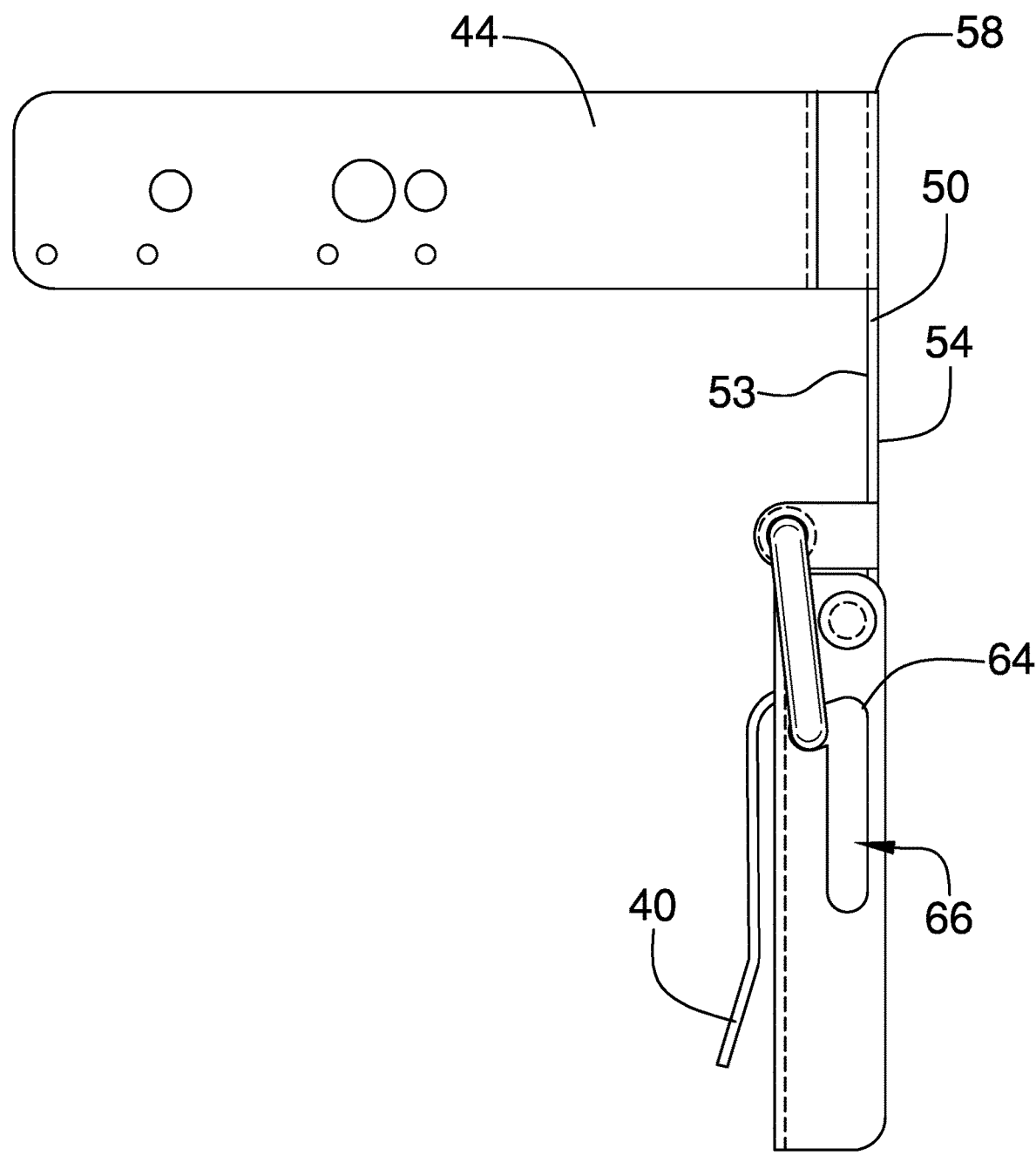
FIG. 6 is a left view of an embodiment of the disclosure.
Figure 7:
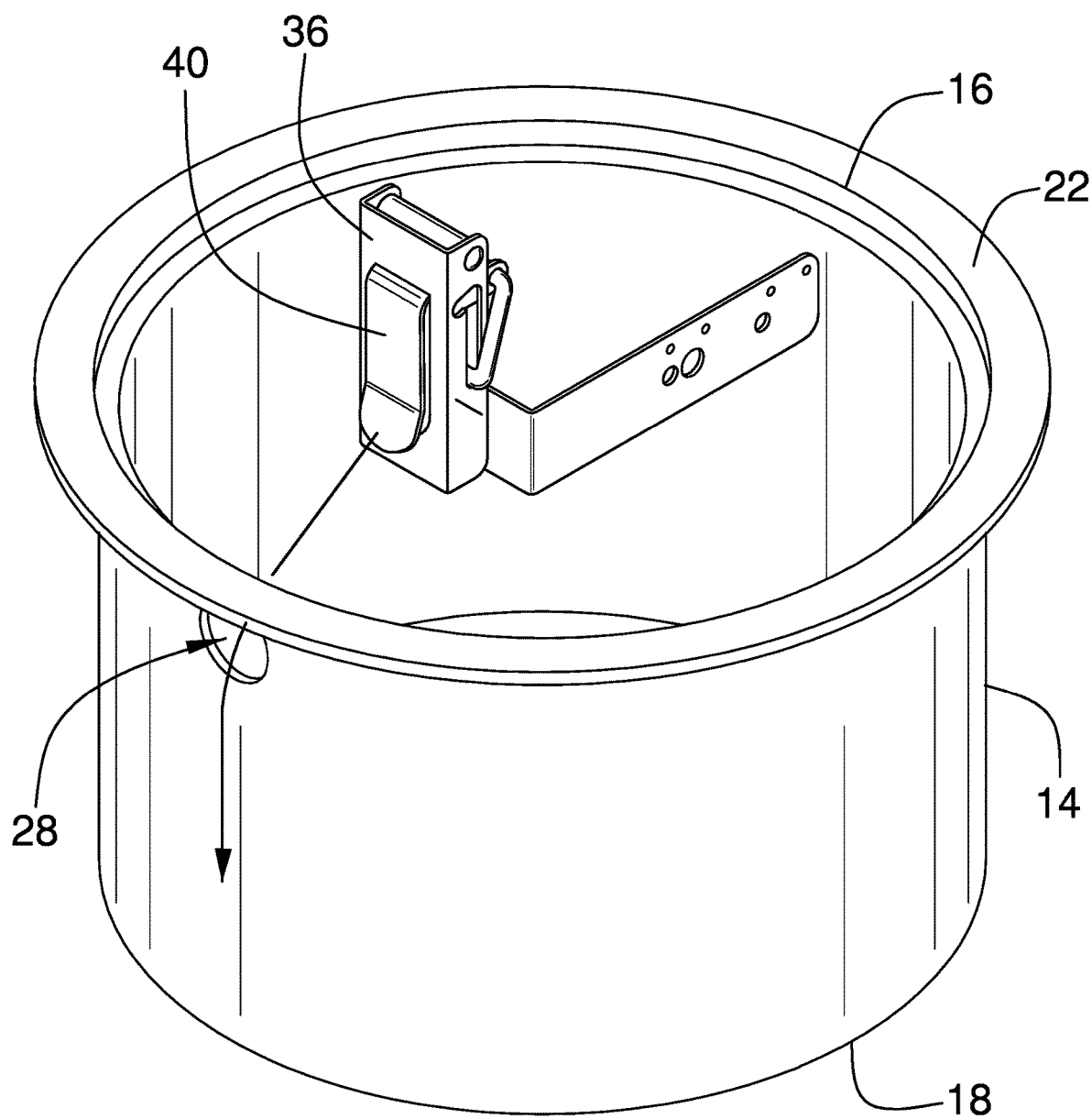
FIG. 7 is a rear and top isometric view of an embodiment of the disclosure.
Figure 8:
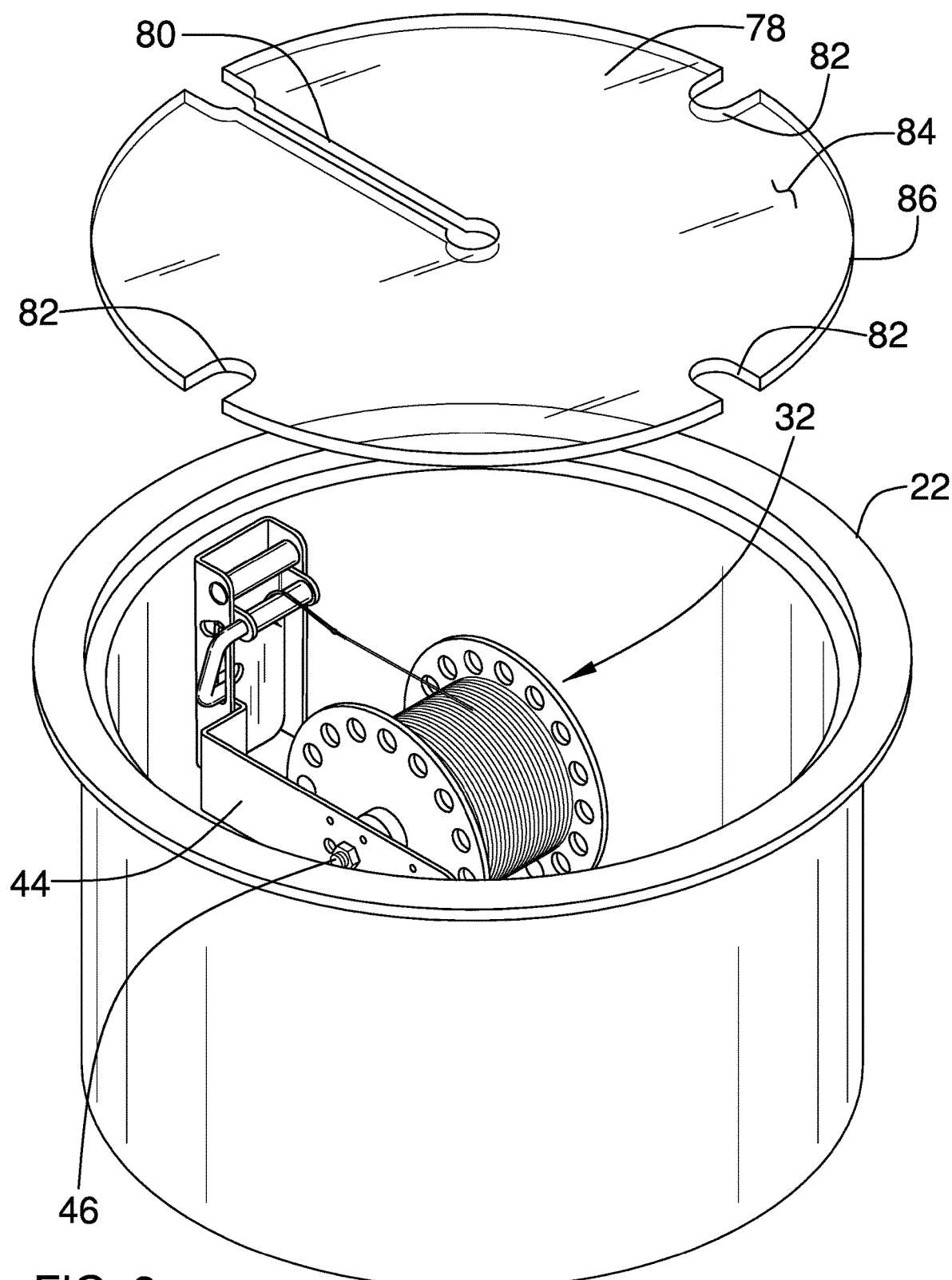
FIG. 8 is a front and top isometric view of an embodiment of the disclosure.
Figure 9:
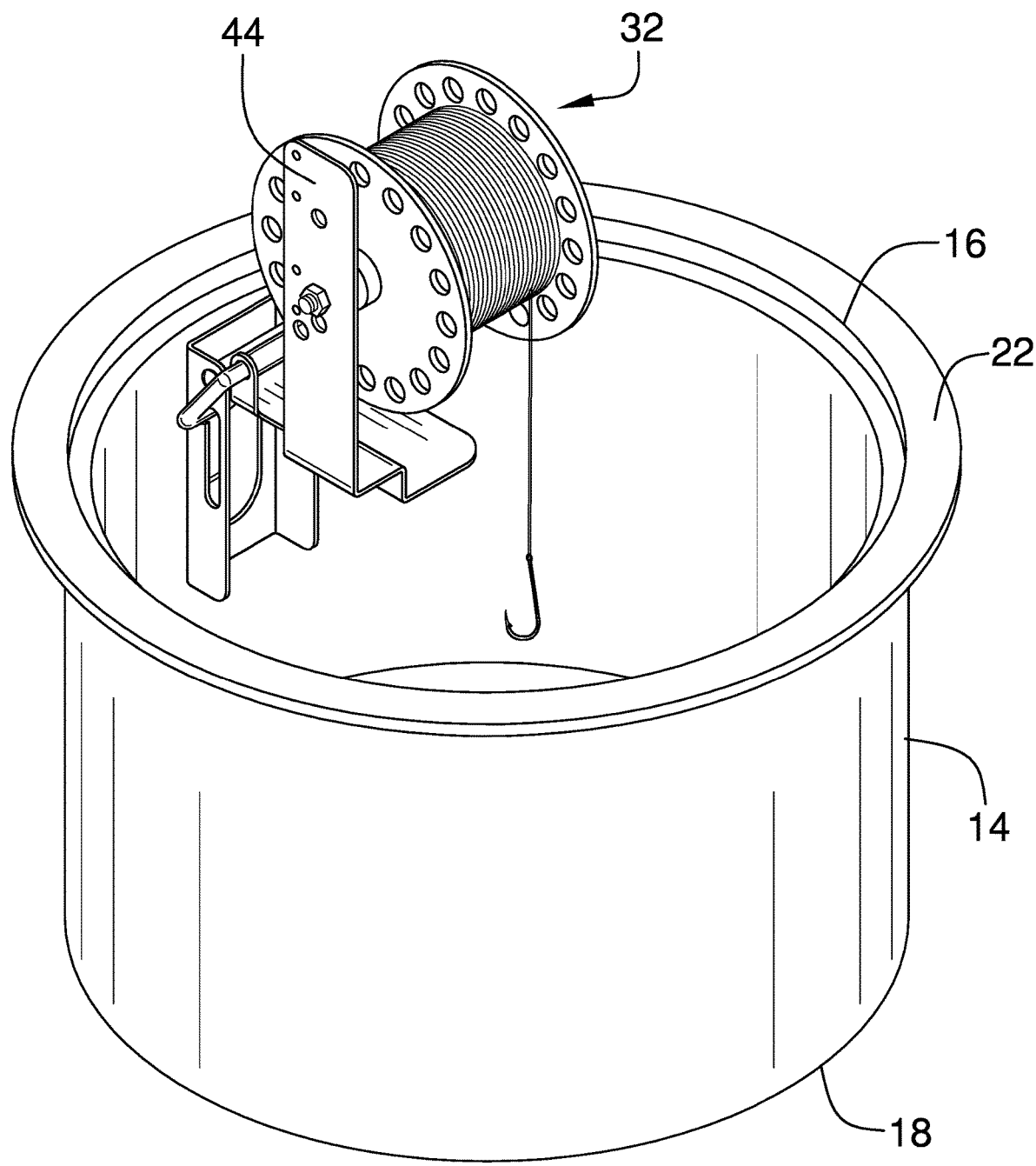
FIG. 9 is a front isometric view of an embodiment of the disclosure.

A carriage 42 is pivotally attached to the mounting plate 34 and includes a reel arm 44. The reel arm 44 extends away from the front side 38 of the mounting plate 34 when the reel mount 30 is in the first position as shown in FIG. 4 such that the reel arm 44 is positioned below the plane of the upper edge 16 and extends toward a central area of the interior of the sleeve 12. The reel arm 44 is positioned at least partially above the plane of the upper edge 16 when the reel mount 30 is in the second position as shown in FIGS. 5 and 6. A spindle 46 is attached to the reel arm. Typically, a longitudinal axis of the spindle 46 is horizontally orientated and may be orientated perpendicular to the reel arm 44. The fishing reel 32 is positioned on and rotatable about the spindle 46 such that fishing line positioned on the fishing reel 32 is extendable downwardly through and outwardly of the sleeve 12. It should be understood that the spindle 46 will typically be the spindle, or a portion of the spindle, of the fishing reel 32 itself.

Figure 10:
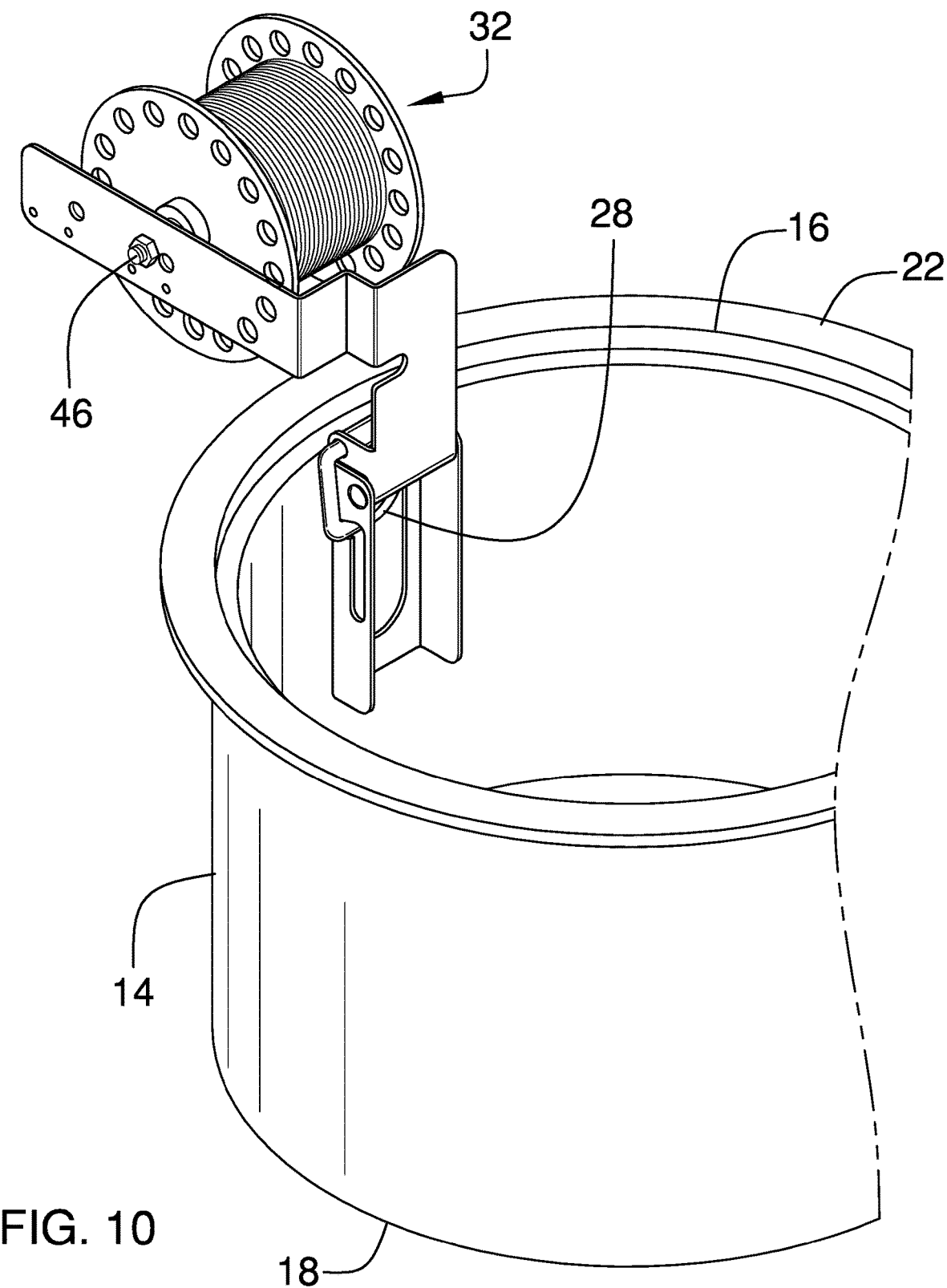
FIG. 10 is a broken front isometric view of an embodiment of the disclosure.
Figure 11:
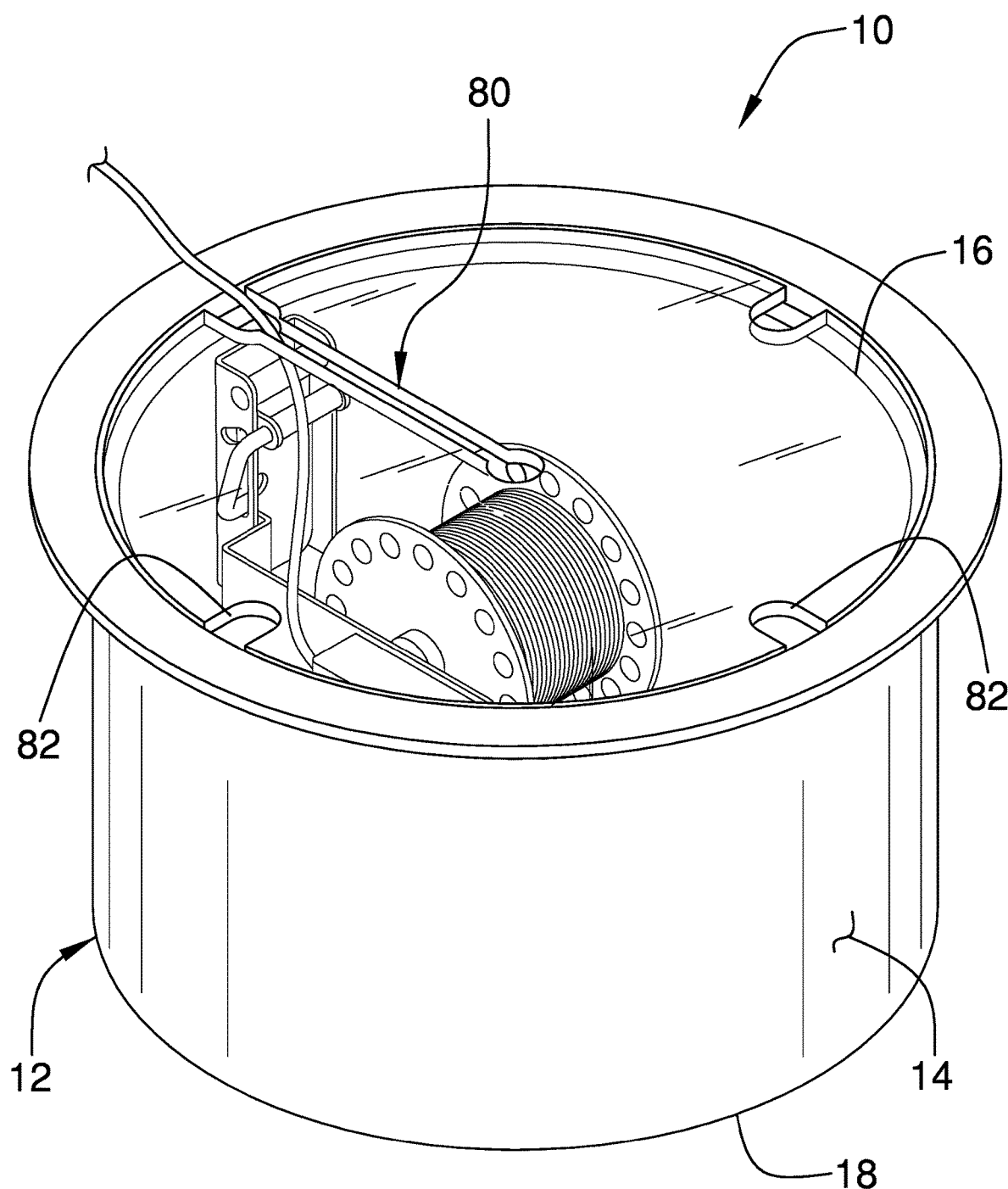
FIG. 11 is a front and top isometric view of an embodiment of the disclosure.
Figure 12:
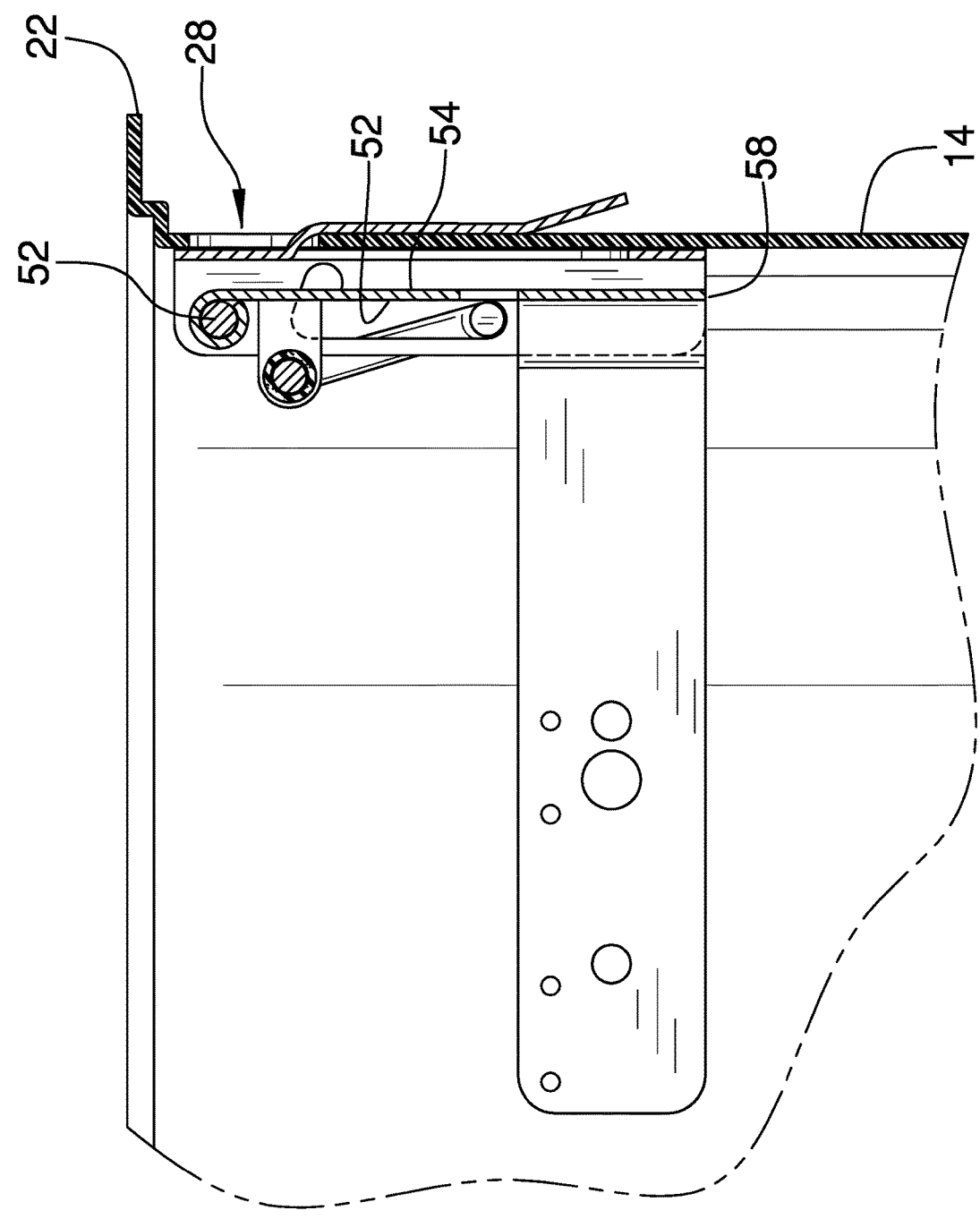
FIG. 12 is a broken cross-sectional view of an embodiment of the disclosure.

In some embodiments, the second position includes a partially retracted position as shown in FIG. 5 and a fully retracted position as shown in FIG. 6. The partially retracted position includes the reel arm 44 extending vertically upwardly through the plane of the upper edge 16 such that the spindle 46 is positioned over the interior of the sleeve 12. This positioning is shown as an example in FIG. 9. The fully retracted position includes the reel arm 44 being fully positioned above a plane of the upper edge 16 and extending away from the sleeve 12 such that the spindle 46 is located above and laterally away from the interior of the sleeve 12 as depicted in FIG. 10. The two positions allow a user to place the fishing reel 32 where desired to facilitate different actions such as placing bait on a hook, removing a fish, untangling fishing line, and the like. A coupler 48 releasably retains the reel arm 44 in either the partially or fully retracted positions.

The carriage 42 further includes a panel 50. A pin 52 extends through and pivotally couples together the panel 50 and the mounting plate 34. The panel 50 has a first side 53 facing the interior of the sleeve 12 and a second side 54 that faces the mounting plate 34 when the carriage 42 in the first position. The reel arm 44 is attached to the panel 50 and extends away from the first side 53. The pin 52 is positioned adjacent to a top edge 56 of the panel 50 when the carriage 42 is in the first position. A bottom edge 58 of the panel 50, opposite of the top edge 56, is pivoted away from the mounting plate 34 as the carriage 42 moves from the first position to the second position. In one embodiment, the mounting plate 34 includes a pair of laterally spaced and forwardly extending side walls 60. The pin 52 extends through a tube formed in the top edge 56 of the panel 50 and through each of the side walls 60, between which the panel 50 is positioned, to pivotally secure the panel 50 to the mounting plate 34.

Figure 2:
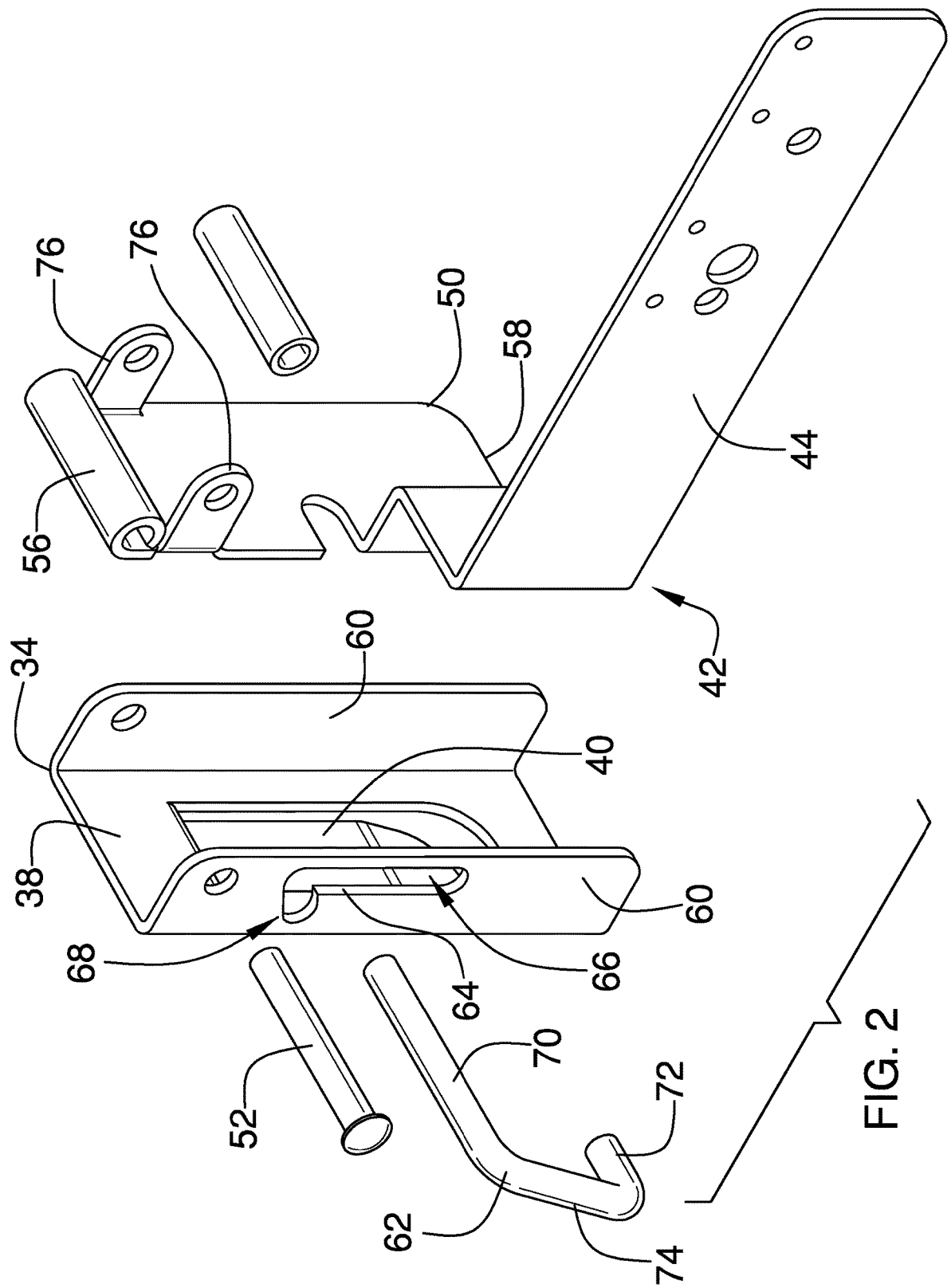
FIG. 2 is a front isometric exploded view of the fishing reel mount of an embodiment of the disclosure.
Figure 3:
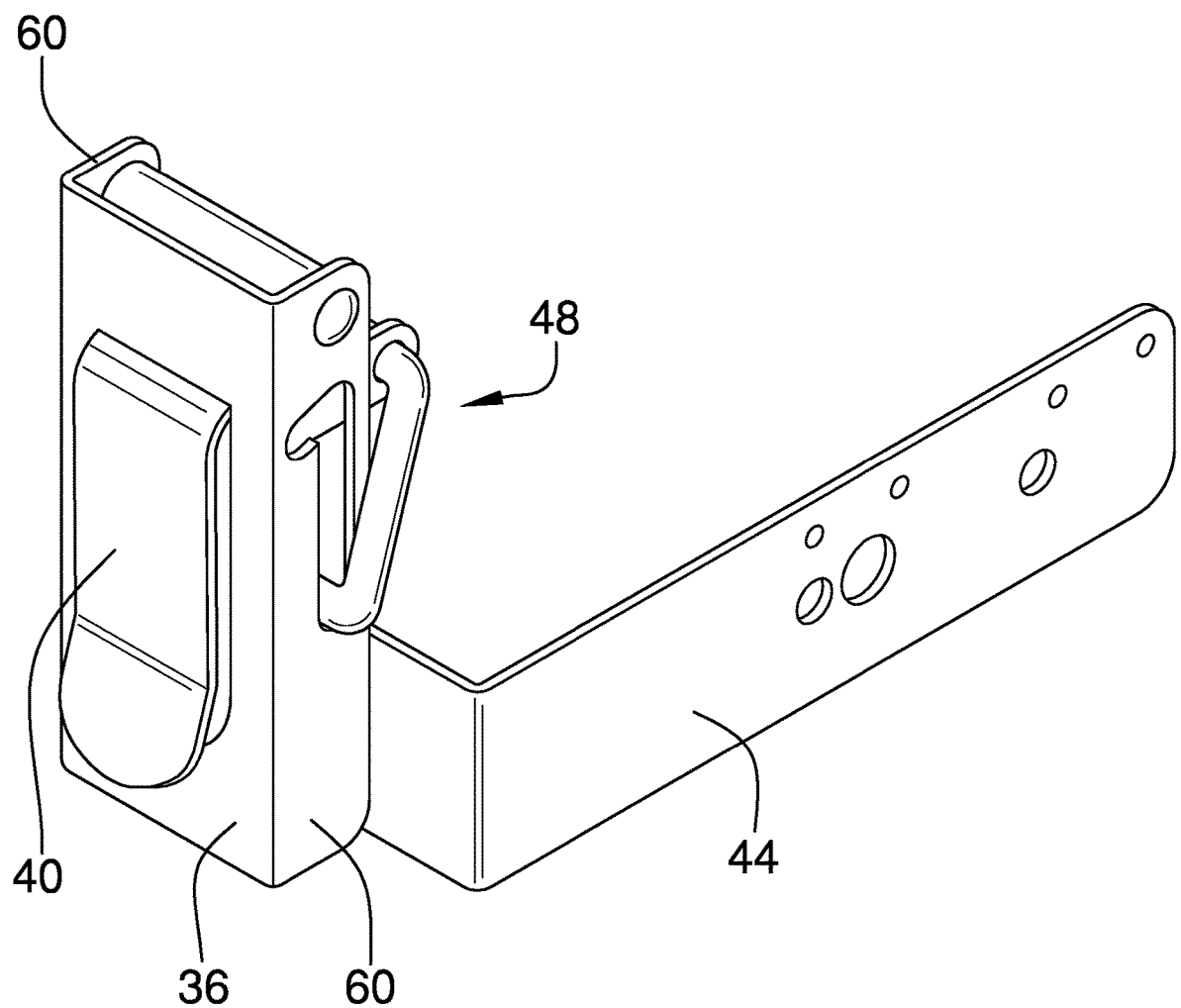
FIG. 3 is a rear isometric view of the fishing reel mount of an embodiment of the disclosure.

The coupler 48 may include a latch 62 that is mechanically engaged with the mounting plate 34 and the reel arm 44 to releasably retain the carriage 42 in the second position. As can be seen in FIG. 2, the latch 62 is positioned in an elongated slot 64 in one of the side walls 60. The elongated slot 64 has a vertical section 66 and a notch section 68 extending laterally away from an apex of the vertical section 66. The notch section 68 may be angled downwardly toward the mounting plate 34. The latch 62 includes a first arm 70, a second arm 72, and a central member 74 extending between the first 70 and second 72 arms wherein the first 70 and second 72 arms are orientated parallel to each other. The first arm 70 is longer than the second arm 72 such that the latch 62 has a J-shaped configuration. The first arm 70 is extended through each of the side walls 60 and a pair of tabs 76 attached to the panel 50. The tabs 76 are positioned below and adjacent to the pin 52. The tabs 76 extend beyond the side walls 60. The second arm 72 is positioned in the elongated slot 64 and travels up the vertical section 66 as the reel arm 44 is pivoted from the first position. The second arm 72 may be placed in the notch section 68 to support the reel arm 44 in the partially retracted position as presented in FIG. 5. In some embodiments the latch 62 may be removed if not needed.

A cover 78 is positionable on the sleeve 12 to close an open upper end of the sleeve 12 when the reel mount 30 is in the first position such that the cover 78 is positioned over the reel mount 30. This prevents a person from tripping over or otherwise interacting with the fishing reel 32 and further inhibits the stepping into the ice the fishing hole 20 by someone walking in the ice fishing house 26. The cover 78 is removable to move the carriage 42 to the second position as needed. The cover 78 will typically be comprised of a transparent, or at least translucent, material, usually of plastic, such that the user of the system 10 can readily view the fishing reel 32. The cover 78 will often include an elongated slit 80 therein extending through a peripheral edge 86 of the cover 78 and extending to a central area of the cover 78. This allows cords for electronic sensors 33 to be extended through the cover 78. Additionally, the cover 78 may have a plurality of notches 82 extending into the peripheral edge or other areas to define finger grips. The cover 78 has a planar top side 84 and may be countersunk into a shoulder 22 as is shown in FIG. 13 to prevent its peripheral edge 86 from being caught on a person's foot and to place the top side 84 at or below an upper surface of the shoulder 22.

In use, the system 10 generally allows a rattle wheel type fishing reel to be used in a conventional way but allows its mounting in the ice fishing hole 20 while further preventing the tripping over the fishing reel 32 by its extension out of the ice fishing hole 20. The cover 78 adds another layer of safety to ensure someone, and in particular children, do not accidentally step into the ice fishing hole 20. Moreover, the cover 78 prevents other articles including lures, small electronics, and personal articles from falling into the ice fishing hole 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fishing reel mounting assembly for selectively positioning within or outside of an ice fishing hole, the assembly including:

a sleeve having a perimeter wall including an upper edge and a lower edge, the sleeve being positionable in and forming a liner for the ice fishing hole, a perimeter shoulder being co-extensively attached to and extending horizontally away from the upper edge;

a reel mount being attached to and positioned in the sleeve, the reel mount being configured to receive a fishing reel, the reel mount being adjustable to a first position wherein the reel mount and the fishing reel are each positioned below a plane of the upper edge and within an interior of the sleeve, the reel mount being adjustable to a second position wherein the reel mount extends above the plane of the upper edge to position the fishing reel above the interior of the sleeve; and a cover being positionable on the sleeve to close an open upper end of the sleeve when the reel mount is in the first position such that the cover is positioned over the reel mount, the cover being removable to move a carriage of the reel mount to the second position.

2. The fishing reel mounting assembly according to claim 1, wherein the perimeter wall has an aperture extending therethrough, the aperture being positioned nearer the upper edge than the lower edge, the reel mount including a mounting plate having a catch thereon, the catch being removably extendable into the aperture to releasably engage the perimeter wall.

3. The fishing reel mounting assembly according to claim 1, wherein the reel mount includes a mounting plate having a back side and a front side, the mounting plate releasably engaging the sleeve such that the front side faces toward an interior of the sleeve.

4. The fishing reel mounting assembly according to claim 3, wherein the reel mount includes:

the carriage being pivotally attached to the mounting plate, the carriage including a reel arm, the reel arm extending away from the front side of the mounting plate when the reel mount is in the first position such that the reel arm is positioned below the plane of the upper edge and extends toward a central area of the interior of the sleeve, the reel arm being positioned at least partially above the plane of the upper edge when the reel mount is in the second position; and a spindle being attached to the reel arm, a longitudinal axis of the spindle being horizontally orientated, wherein the fishing reel is positioned on and rotatable about the spindle such that fishing line positioned on the reel is extendable downwardly through and outwardly of the sleeve.

5. The fishing reel mounting assembly according to claim 4, wherein the reel mount includes the second position including a partially retracted position and a fully retracted position, the partially retracted position including the reel arm extending vertically upwardly through the plane of the upper edge such that the spindle is positioned over the interior of the sleeve, the fully retracted position including the reel arm being fully positioned above a plane of the upper edge and extending away from the sleeve such that the spindle is located above and laterally away from the interior of the sleeve.

6. The fishing reel mounting assembly according to claim 5, wherein the carriage includes a panel, a pin extending through and pivotally coupling together the panel and the mounting plate, the panel having a first side facing the interior of the sleeve and a second side facing the mounting plate when the carriage is in the first position, the reel arm being attached to the panel and extending away from the first side, the pin being positioned adjacent to a top edge of the panel when the panel is in the first position, a bottom edge of the panel opposite of the top edge being pivoted away from the mounting plate as the carriage moves from the first position to the second position.

7. The fishing reel mounting assembly according to claim 6, wherein the reel mount includes a latch being mechanically engaged with the mounting plate and the reel arm to releasably retain the carriage in the second position.

8. The fishing reel mounting assembly according to claim 6, wherein the perimeter wall has an aperture extending therethrough, the aperture being positioned nearer the upper edge than the lower edge, the reel mount including a mounting plate having a catch thereon, the catch being removably extendable into the aperture to releasably engage the perimeter wall.

9. The fishing reel mounting assembly according to claim 1, wherein the cover is comprised of a transparent material.

10. The fishing reel mounting assembly according to claim 1, wherein the covering has an elongated slit therein extending through a peripheral edge of the cover and extending to a central area of the cover.

11. The fishing reel mounting assembly according to claim 1, wherein the cover has a plurality of notches extending into the peripheral edge to define finger grips.

12. The fishing reel mounting assembly according to claim 1, wherein the cover has a planar top side.

13. The fishing reel mounting assembly according to claim 1, wherein the cover is countersunk into the shoulder.

14. The fishing reel mounting assembly according to claim 1 wherein the cover is comprised of a transparent material, the covering having an elongated slit therein extending through a peripheral edge of the cover and extending to a central area of the cover, the cover having a plurality of notches extending into the peripheral edge to define finger grips, the cover having a planar top side, the cover being countersunk into the shoulder.

15. The fishing reel mounting assembly according to claim 14, wherein the perimeter wall has an aperture extending therethrough, the aperture being positioned nearer the upper edge than the lower edge, the reel mount including a mounting plate having a catch thereon, the being removably extendable into the aperture to releasably engage the perimeter wall.

16. A fishing reel mounting assembly for selectively positioning within or outside of an ice fishing hole, the assembly including:
a sleeve having a perimeter wall including an upper edge and a lower edge, the sleeve being positionable in and forming a liner for the ice fishing hole;
a reel mount being attached to and positioned in the sleeve, the reel mount being configured to receive a fishing reel, the reel mount being adjustable to a first position wherein the reel mount and the fishing reel are each positioned below a plane of the upper edge and within an interior of the sleeve, the reel mount being adjustable to a second position wherein the reel mount extends above the plane of the upper edge to position the fishing reel above the interior of the sleeve; and
wherein the perimeter wall has an aperture extending therethrough, the aperture being positioned nearer the upper edge than the lower edge, the reel mount including a mounting plate having a catch thereon, the catch being removably extendable into the aperture to releasably engage the perimeter wall.

17. A fishing reel mounting assembly for selectively positioning within or outside of an ice fishing hole, the assembly including:
a sleeve having a perimeter wall including an upper edge and a lower edge, the sleeve being positionable in and forming a liner for the ice fishing hole;
a reel mount being attached to and positioned in the sleeve, the reel mount being configured to receive a fishing reel, the reel mount being adjustable to a first position wherein the reel mount and the fishing reel are each positioned below a plane of the upper edge and within an interior of the sleeve, the reel mount being adjustable to a second position wherein the reel mount extends above the plane of the upper edge to position the fishing reel above the interior of the sleeve; and
wherein the reel mount includes:
a mounting plate having a back side and a front side, the mounting plate releasably engaging the sleeve such that the front side faces toward an interior of the sleeve;
a carriage being pivotally attached to the mounting plate, the carriage including a reel arm, the reel arm extending away from the front side of the mounting plate when the reel mount is in the first position such that the reel arm is positioned below the plane of the upper edge and extends toward a central area of the interior of the sleeve, the reel arm being positioned at least partially above the plane of the upper edge when the reel mount is in the second position; and
a spindle being attached to the reel arm, a longitudinal axis of the spindle being horizontally orientated, wherein the fishing reel is positioned on and rotatable about the spindle such that fishing line positioned on the reel is extendable downwardly through and outwardly of the sleeve.

18. The fishing reel mounting assembly according to claim 17, wherein the reel mount includes the second position including a partially retracted position and a fully retracted position, the partially retracted position including the reel arm extending vertically upwardly through the plane of the upper edge such that the spindle is positioned over the interior of the sleeve, the fully retracted position including the reel arm being fully positioned above a plane of the upper edge and extending away from the sleeve such that the spindle is located above and laterally away from the interior of the sleeve.

19. The fishing reel mounting assembly according to claim 17, further including a cover being positionable on the sleeve to close an open upper end of the sleeve when the reel mount is in the first position such that the cover is positioned over the reel mount, the cover being removable to move the carriage to the second position.

* * * * *